(12) United States Patent
Qiu et al.

(10) Patent No.: US 8,315,196 B2
(45) Date of Patent: Nov. 20, 2012

(54) METHOD FOR DETERMINING PLACEMENT OF INTERNET TAPS IN WIRELESS NEIGHBORHOOD NETWORKS

(75) Inventors: Lili Qiu, Bellevue, WA (US); Kamal Jain, Bellevue, WA (US); Ranveer Chandra, Ithaca, NY (US); Mohammad Mahdian, Cambridge, MA (US)

(73) Assignee: Microsoft Corporation, Redmond, WA (US)

( * ) Notice: Subject to any disclaimer, the term of this patent is extended or adjusted under 35 U.S.C. 154(b) by 1168 days.

(21) Appl. No.: 10/780,262

(22) Filed: Feb. 17, 2004

(65) Prior Publication Data
US 2005/0180329 A1 Aug. 18, 2005

(51) Int. Cl.
*H04H 20/71* (2008.01)
(52) U.S. Cl. ........................ 370/312; 370/432
(58) Field of Classification Search .......... 370/238
See application file for complete search history.

(56) References Cited

U.S. PATENT DOCUMENTS

| | | | |
|---|---|---|---|
| 5,440,675 A * | 8/1995 | Matsunaga et al. ........... 345/440 |
| 6,405,213 B1 * | 6/2002 | Layson et al. ........................ 1/1 |
| 6,411,598 B1 * | 6/2002 | McGlade ........................ 370/217 |
| 6,771,966 B1 * | 8/2004 | Chow ........................ 455/446 |
| 7,130,789 B2 * | 10/2006 | Glodjo et al. ..................... 705/37 |
| 2002/0018264 A1 * | 2/2002 | Kodialam et al. ............. 359/128 |
| 2002/0101822 A1 * | 8/2002 | Ayyagari et al. ............. 370/235 |
| 2003/0059792 A1 * | 3/2003 | Palsson et al. .................... 435/6 |
| 2003/0099194 A1 * | 5/2003 | Lee et al. ...................... 370/229 |
| 2003/0227924 A1 * | 12/2003 | Kodialam et al. ........ 370/395.21 |
| 2004/0157613 A1 * | 8/2004 | Steer et al. ................... 455/446 |
| 2004/0250128 A1 * | 12/2004 | Bush et al. .................... 713/201 |
| 2004/0267395 A1 * | 12/2004 | Discenzo et al. ............... 700/99 |
| 2005/0010675 A1 * | 1/2005 | Jaggi et al. ..................... 709/232 |
| 2005/0075104 A1 * | 4/2005 | Jain et al. ...................... 455/423 |
| 2005/0078610 A1 * | 4/2005 | Previdi et al. ................. 370/254 |
| 2005/0180329 A1 * | 8/2005 | Qiu et al. ...................... 370/238 |

OTHER PUBLICATIONS

Feige, Uriel, *A threshold of ln n for approximating set cover (Preliminary version)*; pp. 1-11; Department of Applied Math and Computer Science, The Weizmann Institute; Israel (Nov. 3, 1995).
Qiu, Lili et al., *On the Placement of Web Server Replicas*; pp. 1-10; World Wide Web replication (Apr. 2001).
Li, Bo et al., *On the Optimal Placement of Web Proxies in the Internet*; pp. 1282-1290; Department of Computer Science, Hong Kong University of Science and Technology; Hong Kong (1999).
Jamin, Sugih et al., *Constrained Mirror Placement on the Internet*; pp. 1-10; Infocom (2001).
Jamin, Sugih et al., *On the Placement of Internet Instrumentation*; pp. 1-10; IEEE Infocom (2000).
Bejerano, Yigal, *Efficient Integration of Multi-hop Wireless and Wired Networks with QoS Constraints*; pp. 1-12; Mobicom (2002).

* cited by examiner

*Primary Examiner* — Jianye Wu
(74) *Attorney, Agent, or Firm* — Lyon & Harr, LLP; Richard T. Lyon (57) ABSTRACT

Disclosed is a method for determining the placement of ITAPs in wireless neighborhood networks. The method disclosed provides for efficient integration of multi-hop wireless networks with the Internet by placing ITAPs at strategic locations. Initially the method provides for the formulation of the ITAP placement problem under three wireless models. For each model, methods are developed to efficiently place ITAPs in the networks. The methods aim to minimize the number of required ITAPs while guaranteeing users' bandwidth requirements. Next, a fault tolerance version of the placement method is presented that provides bandwidth guarantees in the presence of failures. Finally the methods are extended to take into account variable traffic demands by developing an approximation algorithm to simultaneously optimize ITAP placement based on demands over multiple periods.

3 Claims, 8 Drawing Sheets

METHOD FOR DETERMINING PLACEMENT OF INTERNET TAPS IN WIRELESS NEIGHBORHOOD NETWORKS

TECHNICAL FIELD

The present invention relates generally to computer networks and, more particularly, to wireless neighborhood networks.

BACKGROUND OF THE INVENTION

Unprecedented growth in wireless technology has made a tremendous impact on how we communicate. For example, ubiquitous Internet access through wireless has become a reality in many public places, such as airports, malls, coffee shops, hotels, etc. More recently, early adopters have applied wireless technology to obtain broadband access at home, and a number of neighborhood networks have already been launched across the world. Using wireless as the first mile towards the Internet has a big advantage—fast and easy deployment. Therefore it is especially appealing to homes that are out of reach of cable and digital subscriber link-up (DSL) coverage, such as rural and suburban areas. Even for those areas with cable or DSL coverage, providing an alternative for Internet access is certainly useful, as it helps to increase network bandwidth, and suits the diverse needs of different applications.

There has been a recent surge of interest in building wireless neighborhood networks. One such contemplated implementation presents a scheme to build neighborhood networks using standard 802.11b Wi-Fi technology by carefully positioning access points in the community. Such a scheme requires a large number of access points, and direct communication between machines and the access points. This constraint is difficult to meet in real terrains. Another approach to building neighborhood networks is Nokia's Rooftop technology. This scheme provides broadband access to households using a multi-hop solution that overcomes the shortcomings of the standard 802.11b Wi-Fi solution. The idea is to use a mesh network model with each house deploying a radio. This radio solves the dual purpose of connecting to the Internet and also routing packets for neighboring houses. There is a significant cost in deploying and managing Internet Transit Access Points (ITAPs), used as gateways to the Internet, and therefore it is crucial to minimize the required number of ITAPs to provide QoS and fault tolerance guarantees. A similar problem of efficiently bridging a multi-hop wireless network with the Internet also arises in sensor networks, where sensors collect data and send it through a multi-hop wireless network to servers on the Internet via ITAPs. Both of the above applications of wireless networks require careful placement of Internet TAPs to enable good connectivity to the Internet and efficient resource usage. However, to date these problems have not been addressed in the art.

However, a number of studies on placing servers at strategic locations for better performance and efficient resource utilization in the Internet have been conducted. For example, the placement of Web proxies or server replicas to optimize clients' performance has been examined as has the placement problem for Internet instrumentation. The work on server placement, however, optimizes locality in absence of link capacity constraints. This may be fine for the Internet, but is not sufficient for wireless networks since wireless links are often the bottlenecks. Moreover, the impact of wireless interference, and considerations of fault tolerance and workload variation make the ITAP placement problem very different from those studied to date.

It is worth mentioning that the ITAP placement problem can be considered as a facility location type of problem. Facility location problems have been considered extensively in the fields of operation research and approximation algorithms. Approximation algorithms with good worst case behavior have been proposed for different variants of this problem. However, these results do not concern the case where links have capacities. In addition, the effects of wireless interference and variable traffic demands have not been considered in the previous facility location work.

Yet another solution aims to minimize the number of ITAPs for multi-hop neighborhood networks based on the assumption that ITAPs use a Time Division Multiple Access (TDMA) scheme to provide Internet access to users. However, TDMA is difficult to implement in multi-hop networks due to synchronization and channel constraints. Furthermore, a slotted approach could result in decreased throughput due to unused slots. In comparison, a more general and efficient MAC scheme, such as IEEE 802.11 yields completely different designs and increases applicability of the resulting algorithms. Thus there exists a need for a method for determining the placement of ITAPs under the impacts of link capacity constraints, wireless interference, fault tolerance, and variable traffic demands.

SUMMARY OF THE INVENTION

In view of the foregoing, the present invention provides a method for determining the placement of ITAPs in wireless neighborhood networks. The method disclosed provides for efficient integration of multi-hop wireless networks with the Internet by placing ITAPs at strategic locations. The method takes into account the difficulty and cost of deployment for the wireless neighborhood network while maintaining Quality of Service (QoS) guarantees to end users and the following additional factors: 1.) efficiently using wireless capacity; 2.) taking into account the impact of wireless interference on network throughput; and 3.) robustness in face of failures and changes in user demands.

Initially the method provides for the formulation of the ITAP placement problem under three wireless models. For each model, methods are developed to efficiently place ITAPs in the networks. The methods aim to minimize the number of required ITAPs while guaranteeing users' bandwidth requirements. Next, a fault tolerance version of the placement method is presented that provides bandwidth guarantees in the presence of failures. Finally the methods are extended to take into account variable traffic demands by developing an approximation method to simultaneously optimize ITAP placement based on demands over multiple periods.

BRIEF DESCRIPTION OF THE DRAWINGS

While the appended claims set forth the features of the present invention with particularity, the invention, together with its objects and advantages, may be best understood from the following detailed description taken in conjunction with the accompanying drawings of which:

DETAILED DESCRIPTION OF THE INVENTION

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also be implemented in hardware.

Turning to the drawings, wherein like reference numerals refer to like elements, the invention is illustrated as being implemented in a suitable computing environment. The following description is based on illustrated embodiments of the invention and should not be taken as limiting the invention with regard to alternative embodiments that are not explicitly described herein.

I. Exemplary Environment

Figure 1:
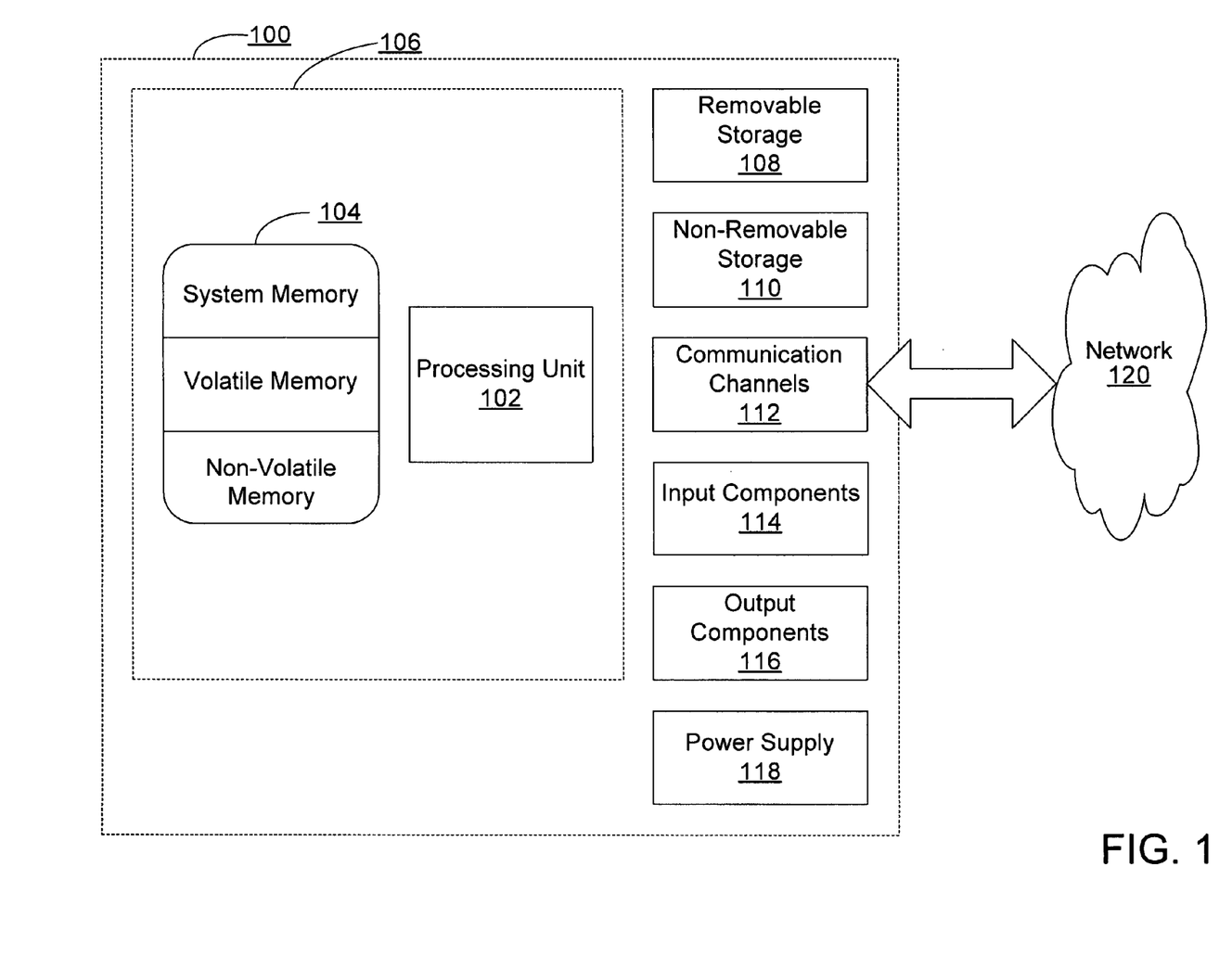
FIG. 1 is a schematic diagram of an exemplary computer architecture on which the model and method of the invention may be implemented.

Referring to FIG. 1, the present invention relates to communications between network nodes on connected computer networks. Each of the network nodes resides in a computer that may have one of many different computer architectures. For descriptive purposes, FIG. 1 shows a schematic diagram of an exemplary computer architecture usable for these devices. The architecture portrayed is only one example of a suitable environment and is not intended to suggest any limitation as to the scope of use or functionality of the invention. Neither should the computing devices be interpreted as having any dependency or requirement relating to any one or combination of components illustrated in FIG. 1. The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing device 100 typically includes at least one processing unit 102 and memory 104. The memory 104 may be volatile (such as RAM), non-volatile (such as ROM and flash memory), or some combination of the two. This most basic configuration is illustrated in FIG. 1 by the dashed line 106.

Computing device 100 can also contain storage media devices 108 and 110 that may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-readable storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer readable storage media include, but is not limited to, RAM, ROM, EEPROM, flash memory or other memory technology, CD-ROM, digital versatile disks or other optical disk storage, magnetic cassettes, magnetic tape, magnetic disk storage or other magnetic storage devices, and any other medium that can be used to store the desired information and that can be accessed by the computing device.

Computing device 100 can also contain communication channels 112 that allow it to communicate with other devices. Communication channels 112 are examples of communications media. Communications media typically embody computer-readable instructions, data structures, program modules, or other data in a modulated data signal such as a carrier wave or other transport mechanism and include any information-delivery media. The term "modulated data signal" means a signal that has one or more of its characteristics set or changed in such a manner as to encode information in the signal. By way of example, and not limitation, communications media include wired media, such as wired networks and direct-wired connections, and wireless media such as acoustic, radio, infrared, and other wireless media. The term computer-readable media as used herein includes both storage media and communications media. The computing device 100 may also have input components 114 such as a keyboard, mouse, pen, a voice-input component, and a touch-input device. Output components 116 include screen displays, speakers, printers, and rendering modules (often called "adapters") for driving them. The computing device 100 has a power supply 118. All these components are well known in the art and need not be discussed at length here.

Figure 2:
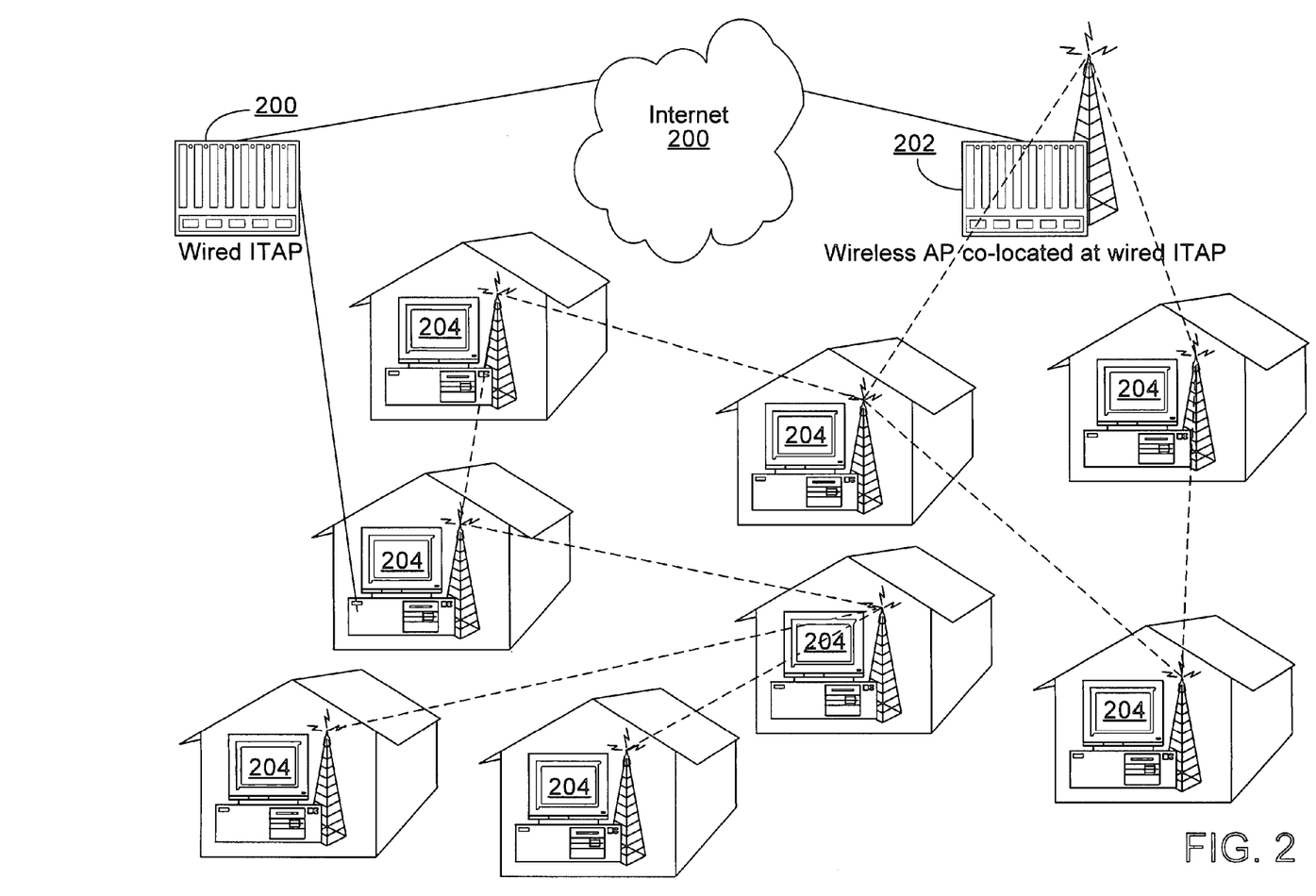
FIG. 2 is a schematic diagram of an exemplary wireless neighborhood network architecture.

II. Model and Method for Determining Placement of ITAPs in Wireless Neighborhood Networks The present invention is directed to a method for determining placement of ITAPs in wireless neighborhood networks. Referring to FIG. 2, the ITAP placement problem, in its simplest form, is to place a minimum number of ITAPs 200, 202 that can serve a given set of nodes 204 on a plane, which can be called houses. A house h is said to be successfully served, if its demand, $w_h$, is satisfied by the ITAP placement. A house h is served by an ITAP i through a path between h and i. This path is allowed to pass through other houses, but any two consecutive points on this path must have wireless connectivity between them. Usually it is the fractional version of this problem that is of interest. That is, the flexibility that a house is allowed to route its traffic over multiple paths to reach an ITAP is what is considered.

The problem that the present invention addresses can be modeled using the following graph-theoretic scheme. Let H denote the set of houses and I denote the set of possible ITAP positions. A graph G can be constructed on the set of vertices H ∪I by connecting two nodes if and only if there is wireless connectivity between them. The goal is to open the smallest number of ITAPs (denoted by the set I), such that in the I' graph G[H ∪I'], one can route $w_h$ units of traffic from house h to points in I' simultaneously, without violating capacity constraints on vertices and edges of the graph, where $w_h$ is the demand from house h.

The edge capacity, $Cap_e$, in the graph denotes the capacity of a wireless link. In addition, each node also has an upper bound on how fast traffic can travel through it. Therefore, each node is also assigned with a capacity, $Cap_h$. Usually $Cap_h=Cap_e$, as both represent the capacity of a wireless link. The methods of the present invention work even when $Cap_h \neq Cap_e$ (e.g., when a node's processing speed becomes the bottleneck). Moreover, each ITAP also has a capacity limit, based on its connection to the Internet and its processing speed. This capacity is called the ITAP capacity, $Cap_i$. In addition to edge and vertex capacities and house demands, another input to the placement methods of the present invention is a wireless connectivity graph (among houses). Whether two houses have wireless connectivity can be determined using real measurements, and the connectivity graph can be input to the placement algorithms for deciding ITAP locations.

A. Incorporating Wireless Interference

There are several possible ways to model wireless interference. One approach is to use a fine-grained interference model based on the notion of a conflict graph. The conflict graph indicates which groups of links mutually interfere and hence cannot be active simultaneously. The conflict graph model is flexible to capture a wide variety of wireless technologies, such as directional antennas, multiple radios per node, multiple wireless channels, and different MAC protocols. For further information refer to United States Patent Application for "Model and Method for Computing Performance Bounds in Multi-hop Wireless Networks," Jain et al., inventors, application Ser. No. 10/680,549, filed on Oct. 7, 2003, which is herein incorporated in its entirety for everything it describes. The impact of wireless interference can be expressed as a set of linear constraints and the ITAP placement problem can then be solved by iteratively solving linear programs. The main challenge of using the fine-grained interference model is high complexity, since for even a moderate-sized network the number of interference constraints can become hundreds of thousands.

An alternative approach is to use a coarse-grained interference model that captures the trend of throughput degradation due to wireless interference. Since there are usually a limited number of wireless channels available, not all links can be active at the same time to avoid interference. As a result, wireless throughput generally degrades with the number of hops in the path as is shown in the following scenario. Consider a linear-chain network, where each link has a unit capacity. Since the interference range of a node is typically larger than the communication range, it is possible that all the nodes in the chain interfere with each other. In this case, only one link can be active at a time, which suggests that the maximum throughput from node 0 to node n is k/n for k<n and 1 for k≧n, where k is the number of available channels, and n is the number of hops. As can be seen, if enough channels are available, the throughput can approach the channel capacity. On the other hand, if there is only one channel, then throughput degrades as a function of 1/n.

In practice, the network topology can be more complicated, and the relationship between throughput degradation and an increasing hop-count depends on many factors, such as communication vs. interference range, the types of antenna (directional vs. omni-directional), MAC protocols, the number of contending radios, etc. There is likely no single function that can capture the impact of interference on wireless throughput. Therefore, the placement problem can be studied under several link models. The link models can be described using two related functions. Throughput$_l$ denotes the amount of throughput on a link along a path of length l, assuming each wireless link capacity is 1. The other function, g(l), denotes the amount of link capacity consumed if it is on a path of length l and the end-to-end throughput of the path is 1. It is clear that g(l)=1/throughput$_l$, since in order to get one unit throughput along a path of length l, 1/throughput$_l$ capacity is needed at each edge along the path, assuming the end-to-end throughput increases proportionally with the edge capacity.

If throughput$_l$=1 for all l, or equivalently, g(l), the basic version of the problem results. This model can be referred to as the Ideal Link Model. This model is appropriate for the environment with very efficient use of spectrum. A number of technologies, such as directional antennas, power control, multiple radios and multiple channels, all strive to achieve close to this model by minimizing throughput degradation due to wireless interference.

A more general model is when throughput$_l$ or g(l) is an arbitrary function of l. This model can be referred to as the General Link Model. As will be shown, the ITAP placement problem can be formulated for the general link model as an integer linear program, and polynomial placement algorithms can be developed. In addition, more efficient heuristics for two forms of g(l) can be developed—the bounded hop-count model and the smooth throughput degradation model.

In the bounded hop-count model, if throughput$_l$=1 for l≦k and throughput$_l$=0 for l>k (or equivalently, g(l)=1 for l≦k and g(l)=∞ for l>k), a variant in which flow cannot be routed through paths of length more than k results. This approximates the case where it is desired to ensure each flow gets at least a threshold amount of throughput by avoiding paths that exceed a hop-count threshold.

The smooth throughput degradation model corresponds to the case when throughput$_l$=1/l, where l is the number of hops in the path. This is equivalent to g(l) for all l's (i.e., the capacity consumed is equal to the flow times the number of hops). This represents a conservative estimate on throughput in a linear-chain network as was shown above, and therefore this model is appropriate when tight bandwidth guarantees are desired.

B. Incorporating Fault Tolerance Consideration and Workload Variation

A multi-hop scheme for building neighborhood networks has a number of advantages, such as a reduced number of ITAPs and ease of deployment among others. However, such a scheme also requires different houses along a path to the ITAP to forward the traffic to and from a house. The bandwidth requirements of a house may not be satisfied if even one house decides to shut itself down. Furthermore, ITAPs may be temporarily down. The placement method of the present invention handles such scenarios by routing traffic through multiple independent paths, and over-provisioning the delivery paths. The fault tolerance consideration has significant impact on the placement decision.

Several studies show that user traffic demands exhibit diurnal patterns. Since it is not easy to change ITAP locations once deployed, ideally these ITAPs should handle demands over all periods. Embodiments of the present invention provide for simultaneous optimization of ITAP locations based on workload during different periods.

C. Reducing the Search Space for ITAP Positions

Figure 3A:
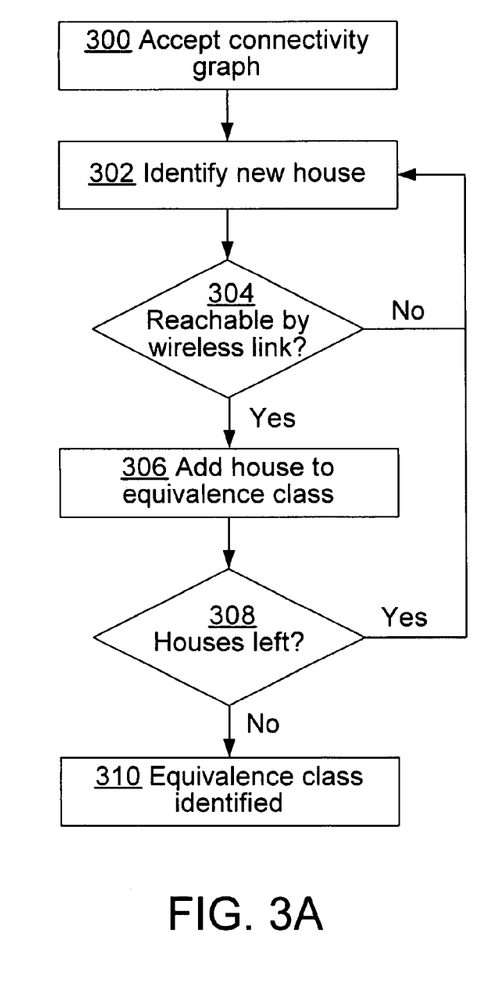
FIG. 3 is a flowchart illustrating the methods of identifying equivalence classes and pruning.
Figure 3B:
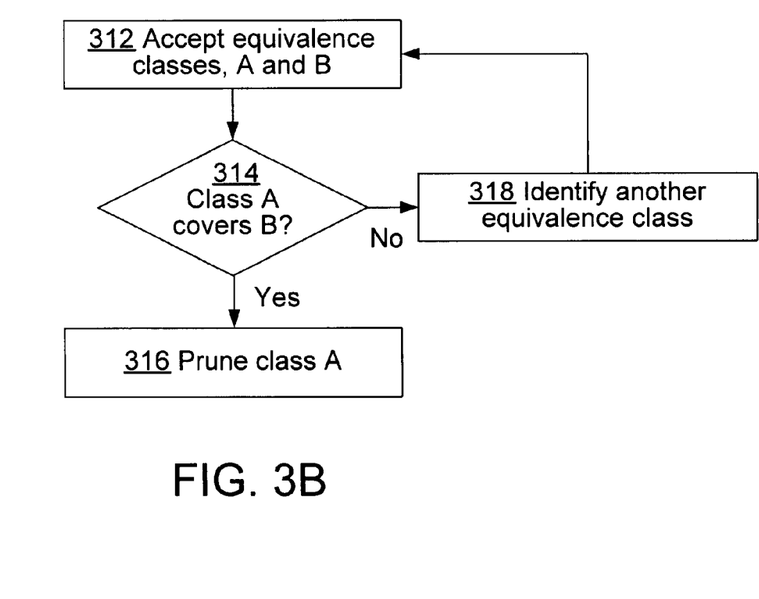

All points on the plane could be potential ITAP locations. To make search tractable, a pruning method is illustrated in FIGS. 3A and 3B. It is based on the following two observations. First, points on the plane 300, 302 can be grouped into equivalence classes, where each equivalence class is represented by the set of houses that are reachable via a wireless link 304. If placing multiple ITAPs at the same location is allowed, then it is straightforward to show that searching over all points on the plane is equivalent to searching over all the equivalence classes (i.e., it is only necessary to pick one node from each equivalence class for the search, since all the points in one equivalence class are equivalent as far as ITAP placement is concerned). In this way, the number of ITAP locations is reduced to EC 310, where EC is the number of equivalence classes.

The number of equivalence classes can still be large. The search space can be further pruned using the following heuristic. Given two equivalence classes A and B 312, let houses$_A$ and houses$_B$ denote the set of houses that have wireless connectivity with classes A and B, respectively. If houses$_A \subseteq$ houses$_B$ (i.e., A is covered by B) 314, then the class A is pruned 316. The above reduction schemes help significantly reduce the search space.

In the following sections, different variants of the placement problem are investigated. The general approach is as follows. Given a set of potential ITAP locations, which may include all or a subset of points in the neighborhood, first the reduction method described above is applied to prune the search space. Then based on the choice of wireless link model, fault-tolerance requirement, and demand variation, one of the placement methods is applied to determine ITAP locations.

III. Ideal Link Model

The ITAP placement problem can first be considered under the ideal link model. The problem is formulated as a linear program and two placement methods follow.

The placement problem for the ideal link model is formulated as an integer linear program shown below. For each edge e and house h, a variable $x_{e,h}$ can be defined to indicate the amount of flow from h to ITAPs that are routed through e. For each ITAP i a variable $y_i$ can be defined that indicates the number of ITAPs opened at the location i (more precisely, $y_i$ is the number of ITAPs opened at locations in the equivalence class i). $Cap_e$, $Cap_h$, and $Cap_i$ denote the capacity of the edge e, house h, and ITAP i, respectively; $w_h$ denotes the traffic demand generated from house h.

$$\text{minimize} \sum_{i \in x} y_i \text{ subject to}$$

-continued $$\sum_{e=(v,h')} x_{e,h} = \sum_{e=(h',v)} x_{e,h} \quad \forall h, h' \in H, h' \neq h$$

$$\sum_{e=(h,v)} x_{e,h} \geq w_h \quad \forall h \in H$$

$$\sum_{e=(v,h)} x_{e,h} = 0 \quad \forall h \in H$$

$$\sum_{h} x_{e,h} \leq Cap_e \quad \forall e \in E(G)$$

$$\sum_{h',e=(v,h)} x_{e,h'} \leq Cap_h \quad \forall h \in H$$

$$\sum_{h',e=(v,i)} x_{e,h'} \leq Cap_i y_i \quad \forall i \in I$$

$$\sum_{e=(v,i)} x_{e,h'} \leq w_h y_i \quad \forall i \in I, h \in H$$

$$x_{e,h} \geq 0 \quad \forall e \in E(G), h \in H$$

$$y_i \in \{0, 1, 2, \ldots\} \quad \forall i \in I$$

The first constraint formulates the flow conservation constraint (i.e., for every house except the house originating the flow, the total amount of flow entering the house is equal to the total amount of flow exiting it). The second constraint formulates that each house has $w_h$ amount of flow to send, and the third constraint indicates that a house does not receive flow sent by itself. The next three constraints capture the capacity constraints on the edges, houses, and ITAPs. The seventh constraint says that no house is allowed to send any traffic to an ITAP unless the ITAP is open. It should be noted that this inequality is redundant and follows from the ITAP capacity constraint and the assumption that $y_i$ is an integer. However, if there is a desire to relax the integrality assumption on $y_i$'s in order to derive a lower bound using a linear program solver, then it is important to include this inequality in the linear program so that a tighter lower bound can be obtained.

As will be appreciated by one of ordinary skill in the art, it is NP-hard to find a minimum number of ITAPs required to cover a neighborhood in an ideal link model. Moreover, the problem has no polynomial approximation algorithm with an approximation ratio better than ln n unless P=NP. As such, various placement methods for the ITAP placement problem under the ideal link model can be developed that yield results close to the optimal case. In particular there is the greedy method and the augmenting method.

Figure 4A:
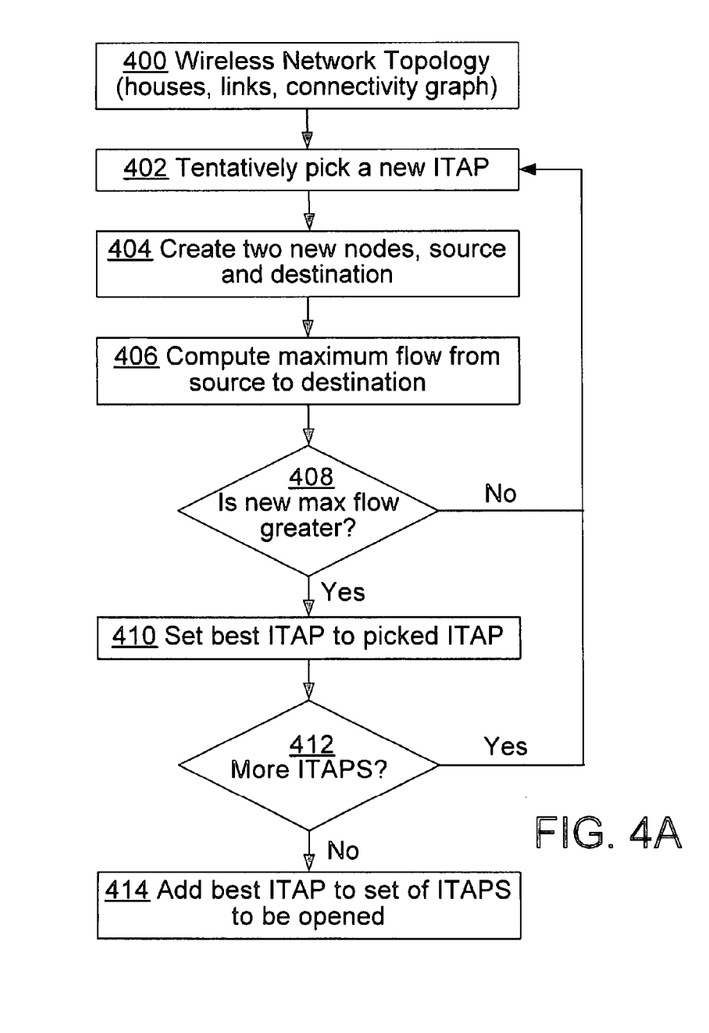
FIG. 4 is a flowchart illustrating the methods of greedy placement and augmenting placement for an ideal link model.

FIG. 4A illustrates the greedy placement method which is also outlined by the pseudo-code below.

Input: Set of houses H, set of ITAPs I, graph G on the set H ∪ I with capacities on its edges and vertices.
Output: A multiset S of ITAPs to be opened.
begin
    S := 0; Flow := 0;
    while Flow is less than the total demand do
        max := 0;
        for each j ∈ I do
            Let G' be the subgraph of G induced on
            H ∪ S ∪ {j}, with the same capacities
            as G. (If there are duplicates in S ∪ {j},
            create one point for each duplicated
            element.)
            For each house, transform its vertex
            capacity constraint to an edge capacity
            constraint by replacing the house h with
            two nodes, in$_h$ and out$_h$; and connect -continued

```
         in_h to out_h using a directed
         edge with capacity cap_h; all incoming
         edges toward the house go to in_h and
         all out-going edges from h come from out_h.
         Add two vertices s and t to G', edges
         of capacity w_h from s to each
         h ∈ H, and edges of capacity cap_i
         from each i ∈ S ∪ {j} to t.
         Find the maximum flow from s to t in G';
         Let f be the value of this flow.
         if f > max, then
              max := f; bestITAP := j;
      endfor;
      S := S ∪ {bestITAP}; Flow := max;
   endwhile;
end.
```

An ITAP is iteratively picked 402 that maximizes the total demands satisfied 408 when opened in conjunction with the ITAPs chosen in the previous iterations 414. The major challenge is to determine how to make a greedy move in each iteration. This involves efficiently computing the total user demands that can be served by a given set of ITAPs. An important observation can be made; computing the total satisfied demands can be formulated as a network flow problem. This suggests that the network flow algorithms can be applied to efficiently determine the satisfied demands. A few transformations are required to make the network flow algorithm applicable. For each house, its vertex capacity constraint is transformed to an edge capacity constraint by replacing the house h with two nodes, $in_h$ and $out_h$. $In_h$ is connected to $out_h$ using a directed edge with capacity $Cap_h$. All incoming edges toward the house go to $in_h$ and all outgoing edges from h come from $out_h$. In step 404, two vertices, s and t are added to the connectivity graph. Edges of capacity $w_h$ from s to each h in the set of houses are also added. Additionally, edges of capacity $Cap_i$ from each i (opened ITAP) to t are added. In step, 406 the maximum flow from s to t is computed. If this value is greater 408 than the current maximum flow (initialized to zero) then the tentatively selected ITAP becomes the best ITAP to open 410. This method finds a multiset S of ITAPs to open, where a multiset is the same as a set, except that it allows duplicate elements. Allowing duplicate elements in S indicates that multiple ITAPs can be opened in the locations that belong to the same equivalence class (i.e., reachable from the same set of houses), which is certainly feasible.

Figure 4B:
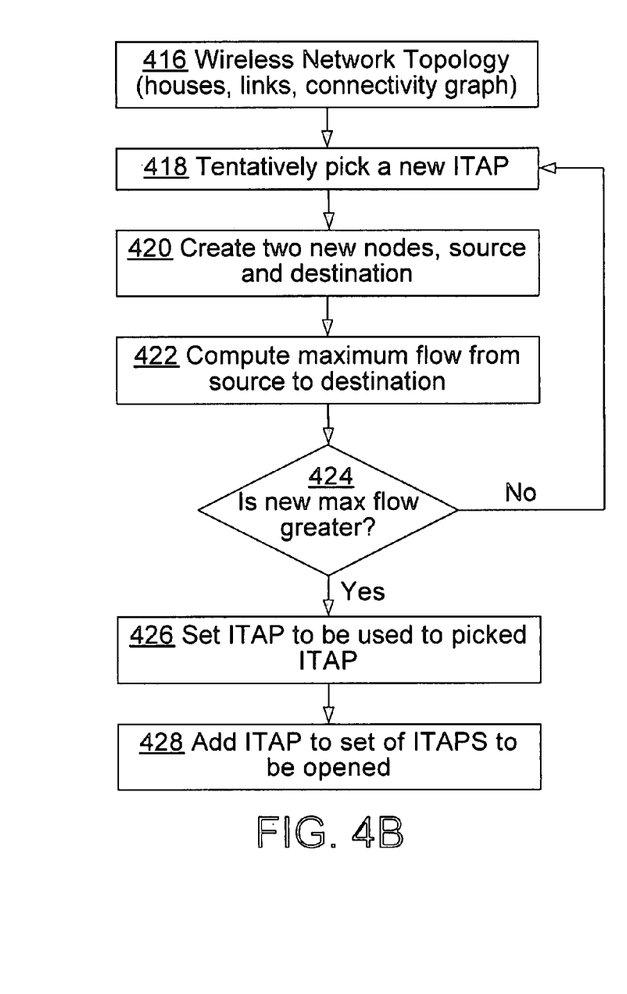

FIG. 4B illustrates the augmenting placement method. The idea of the augmenting placement method is similar to the greedy method. The main difference in the augmenting method is that a greedy move is not made; instead any ITAP that leads to an increase in the amount of supported flow is satisfactory. More specifically, the set of possible ITAP locations is searched 418, 420, 422 and the first ITAP that results in an increase in the amount of flow 424 when opened together with the already opened ITAPs is opened 426, 428.

IV. General Link Model

The problem of efficient ITAP placement is more challenging when the throughput along a path varies with the path length. This corresponds to the general link model introduced above. In this section, the problem for a link model with an arbitrary throughput degradation function is formulated and then efficient heuristics for two variants of this degradation function are presented.

The placement problem for the general link model is formulated as an integer linear program shown below. In this program $w_{e, h, l, j}$ denotes the total amount of flow routed from house h to the ITAPs using a path of length l when edge e is the j'th edge along the path. Variable $y_i$ is an indicator of the number of ITAPs opened in the equivalence class i, and each house h has $w_h$ units of traffic to send. The throughput degradation function for a path of length l is denoted by g(l). L is an upper bound on the number of hops on a communication path, and if there is no such upper bound, L=|H|. The remaining variables in the program are similar to the ones used by the ideal link linear program formulation presented above.

$$\text{minimize} \sum_{i \in x} y_i \text{ subject to}$$

$$\sum_{e=(v,h')} x_{e,h,l,j} = \sum_{e=(h',v)} x_{e,h,l,j+1} \quad \forall h, h' \in H, h' \neq h, l, j \in \{1, \ldots, L\}, j < 1$$

$$\sum_{e=(h,v),l} x_{e,h,l,j} \geq w_h \quad \forall h \in H$$

$$\sum_{h,l,j \leq l} g(l) x_{e,h,l,j} \leq Cap_e \quad \forall e \in E(G)$$

$$\sum_{h',e=(v,h),l,j \leq l} g(l) x_{e,h',l,j} \leq Cap_h \quad \forall h \in H$$

$$\sum_{h',e=(v,i),l,j \leq l} g(l) x_{e,h',l,j} \leq Cap_i y_i \quad \forall i \in I$$

$$\sum_{e=(u,i),l,j \leq l} x_{e,h,l,j} \leq w_h y_i \quad \forall i \in I, h \in H$$

$$x_{e,h,l,j} \geq 0 \quad \forall e \in E(G), h \in H, l, j \in \{1, \ldots, L\}, j \leq 1$$

$$y_i \in \{0, 1, 2, \ldots\} \quad \forall i \in I$$

As the ideal link model discussed above is a special case of the general link model, it will be recognized by one of ordinary skill in the art that it is also NP-hard to find a minimum number of ITAPs to cover a neighborhood for a general link model. As such, various placement methods for the ITAP placement problem under the general wireless link model can be developed that yield results close to the optimal case. First a general throughput degradation model is described and then more efficient methods for two special cases: bounded hop-count and smooth throughput degradation are described.

The high-level idea of the greedy method is similar to the one presented for the ideal link model. Iteratively ITAPs are selected to maximize the total user demands satisfied. The new challenge is to determine a greedy move in this model. Unlike in the ideal link model, the total satisfied demands cannot be computed by modeling it as a network flow problem since the amount of flow now depends on the path length. As will be described below, this computation can be done by solving a linear program, or by using a heuristic.

Without making assumptions about g(l), the total satisfied user demands can be computed for a given set I' of ITAPs, by solving a linear program problem slightly modified from the one above. In this linear program, the variable $y_i$ is replaced by the number of occurrences of i in I' (this amounts to removing all the variables corresponding to edges ending in ITAP positions outside I' and removing inequalities containing these variables). The objective becomes to maximize $\Sigma_h \Sigma_{e=(h, v), i} x_{e, h, l, 1}$, which corresponds to maximizing the satisfied demands. The second constraint is also modified to be $\Sigma_{e=(h, v), i} x_{e, h, l, 1} \leq w_h$ in order to limit the maximum flow from each house h.

In theory, solving a linear program takes polynomial time. However, in practice a linear program solver, such as cplex (see Ilog cplex suite, 2003, http://www.ilog.com/products/ cplex/), can only handle small-sized networks under this model due to the fast increase in the number of variables and constraints with the network size. As an alternative, two forms of g(l) are considered below: (i) bounded hop-count: g(l)=1 for all l≤k, and g(l)=∞ for l>k; and (ii) smooth degradation: $g_l$=1 for all l. More efficient greedy methods are developed for both cases.

Figure 5:
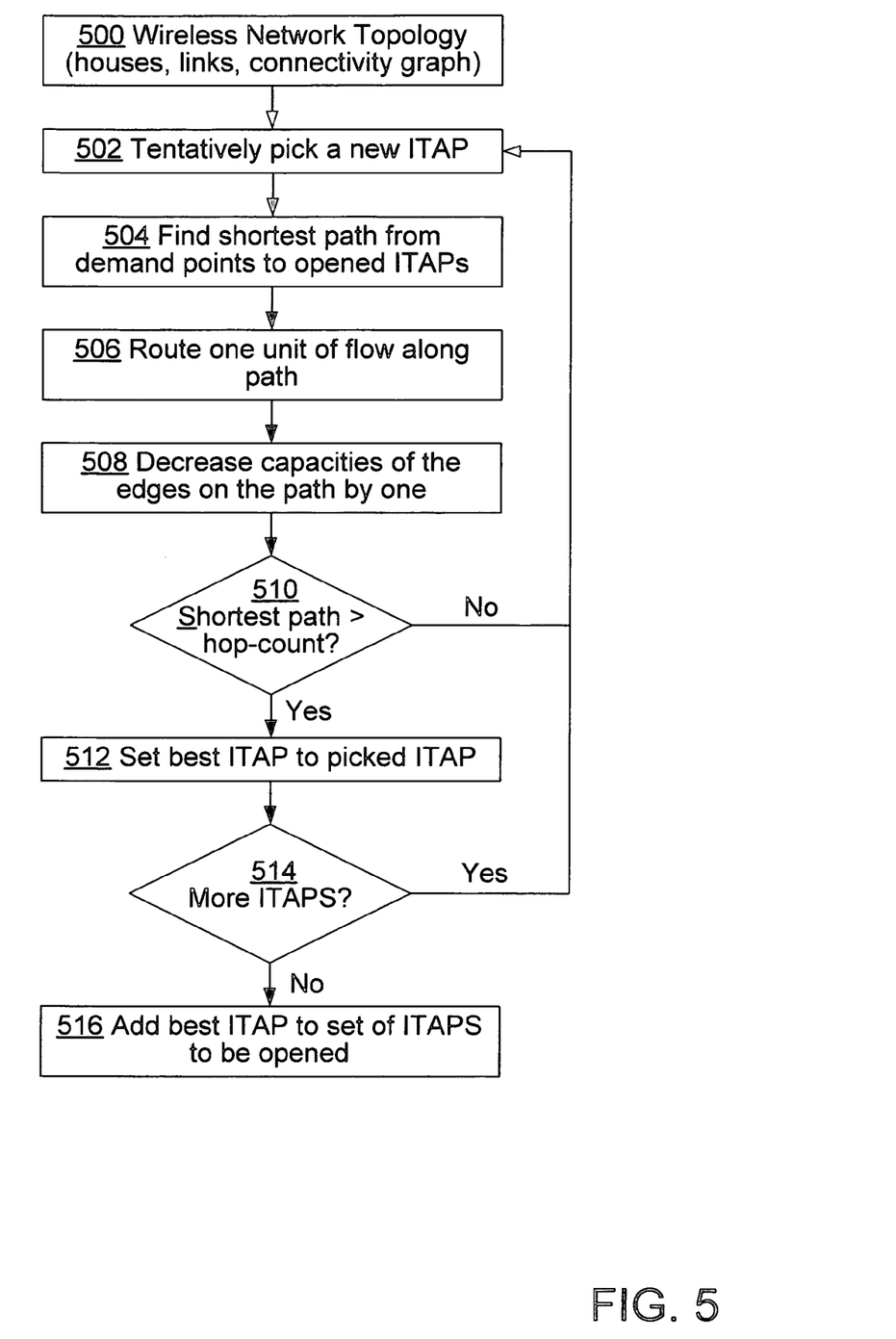
FIG. 5 is a flowchart illustrating the method of greedy placement for a general link bounded hop-count model.

FIG. 5 illustrates the efficient method for the bounded hop-count model which can be used to find the total demands satisfied by a given set of ITAPs. In each iteration, the method finds the shortest path from demand points to opened ITAPs in the residual graph 504, routes one unit of flow along this path 506, and decreases the capacities of the edges on the path by one in the residual graph 508. This is continued until the shortest path found has length more than the hop-count bound 510. While this heuristic does not guarantee computing the maximum flow (so each greedy step is not local optimal), it works very well in practice.

Figure 6:
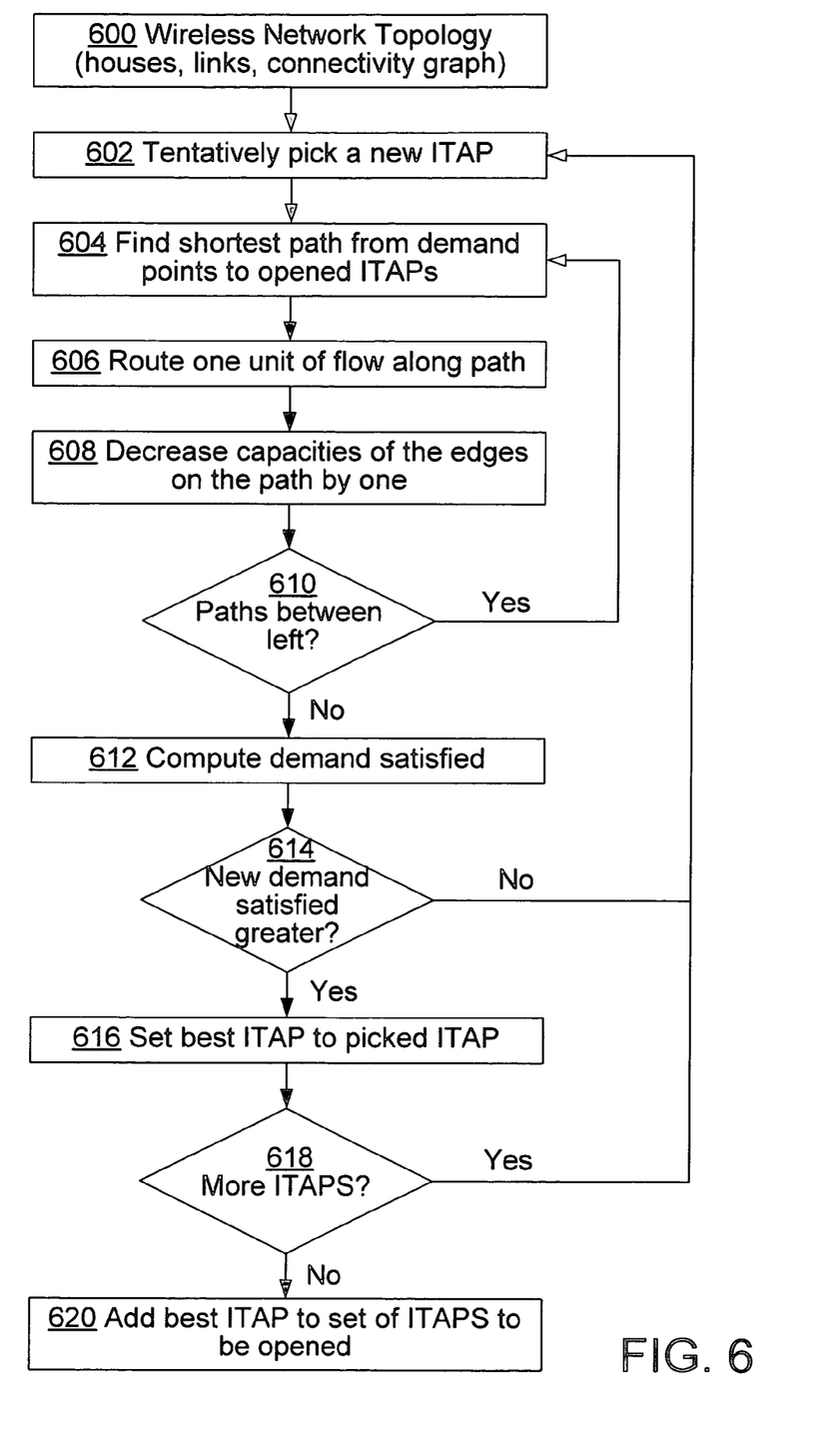
FIG. 6 is a flowchart illustrating the method of greedy placement for a general link smooth throughput degradation model.

FIG. 6 illustrates the efficient method for the smooth throughput degradation model. When g(l)=1 or throughput, =1/l, the total demands satisfied by a set of ITAPs are given by the expression: maximize $\Sigma p_i \epsilon P 1/|p_i|$ where P is a collection of edge-disjoint paths in the graph and $|p_i|$ denotes the length of the path $p_i$. Therefore to maximize this objective function, the heuristic should prefer imbalance in path lengths and this motivates the following method. As with the heuristic for the bounded hop-count model, in the smooth throughput degradation model the total demands satisfied by the selected ITAPs is computed through iteratively removing shortest paths in the residual graph 604, 606, 608. However, the following modifications are made. First, since bounds on hop-count are no longer present, picking paths is continued until there is no path between any demand point and any open ITAP 610. Second, to ensure the throughput follows throughput(l) =1/l, after all the paths are obtained, the demand satisfied along each path p, denoted as $SD_p$, is computed 612 according to the throughput function, throughput(l)=1/l, and the total satisfied demands are the sum of $SD_p$ over all paths p. Although this method does not always find the maximum flow (so each greedy step is not local optimal), it does yield very good performance.

Figure 7:
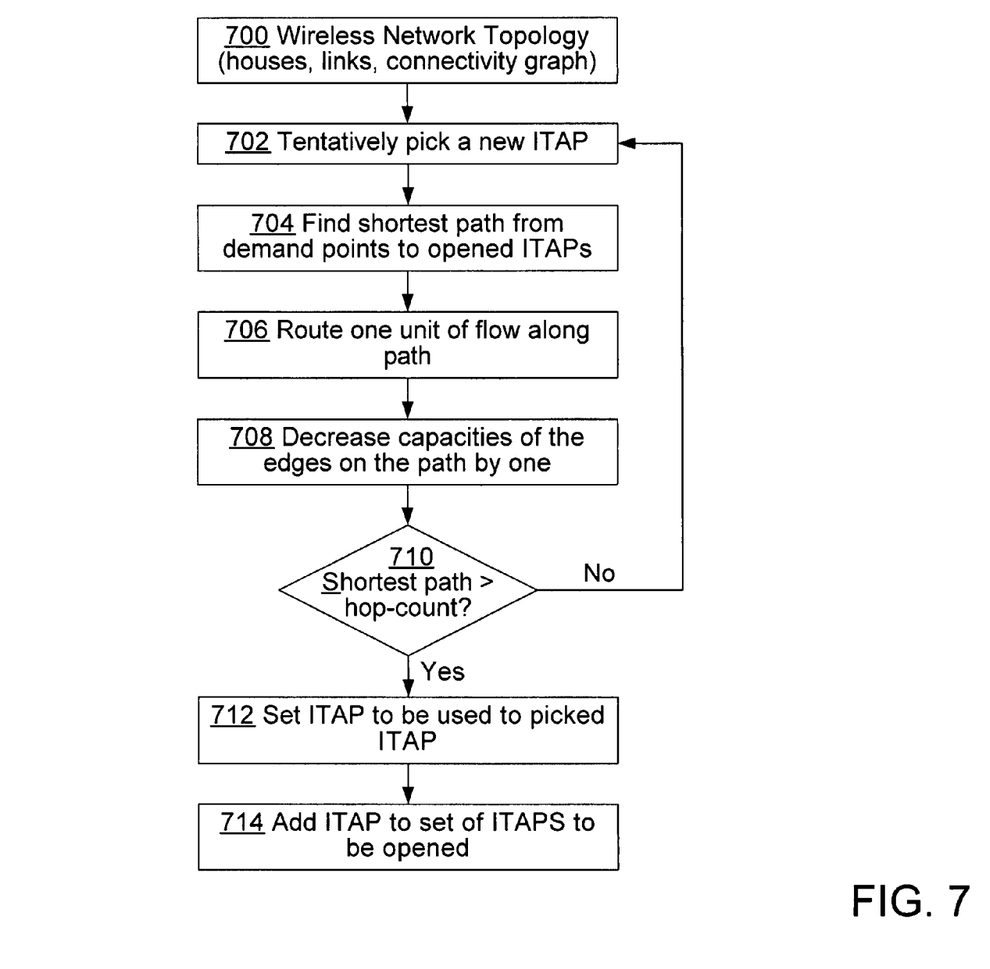
FIG. 7 is a flowchart illustrating the method of augmenting placement for a general link bounded hop-count model.
Figure 8:
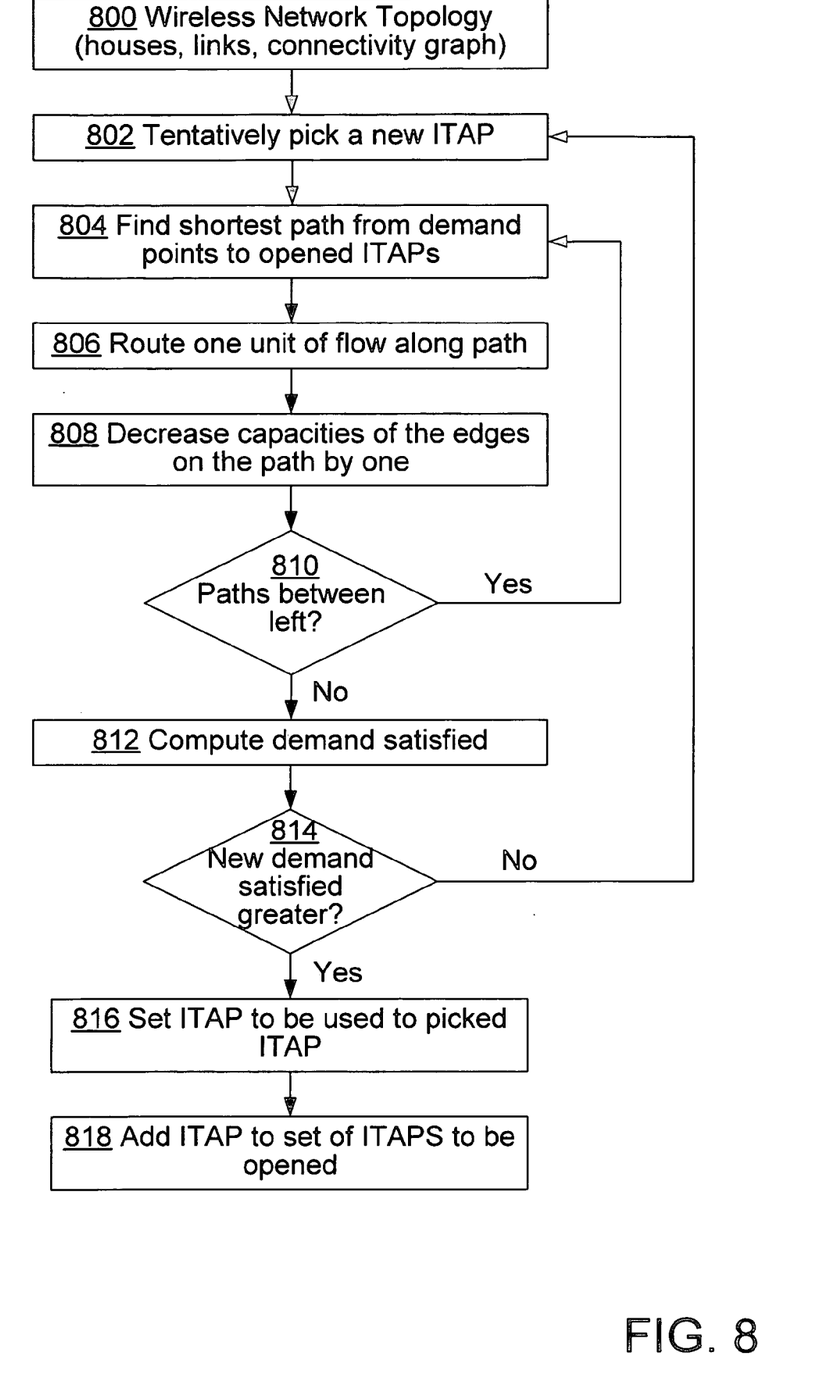
FIG. 8 is a flowchart illustrating the method of augmenting placement for a general link smooth throughput degradation model.

FIGS. 7 and 8 illustrate the corresponding general link model augmenting methods. The same method described above is used to compute the total demands satisfied by a given set of ITAPs. The difference between the greedy and augmenting algorithms is in the way ITAPs are selected in each iteration. While the greedy algorithm selects an ITAP that results in a maximum increase in the supported demands, the augmenting algorithm picks the first ITAP that leads to an increase in the supported demands 710, 712 and 814, 816.

V. Fault Tolerance Consideration

A practical solution to the ITAP placement problem should ensure Internet connectivity to all the houses in the neighborhood, even in the presence of a few ITAP and house failures. In this section an enhancement to the problem is presented by incorporating this fault tolerance constraint. Fault tolerance is achieved by providing multiple independent paths from a house to ITAPs, and over-provisioning the delivery paths. Over-provisioning is a scheme that allocates more flow to a house than is desired and therefore helps in providing QoS guarantees even when there are a few failures.

The placement problem is formulated with the fault tolerance constraint. Let each house have one unit of demand and d independent paths to reach the ITAPs. Let the average failure probability of a path be p and the over-provisioning factor be f (i.e., each independent path allocates f/d capacity to a house and the total capacity allocated to a house by d independent paths is f).

Since for every house, there are d independent paths from this house to ITAPs and the probability of failure of each path is p, the probability that exactly i of these paths fail is $\binom{d}{i}p^i(1-p)^{d-i}$. In this case, the amount of traffic that can be delivered is min ((d−i)f/d, 1). Therefore, the expected fraction of the traffic from a house that can reach an ITAP, S (f, p, d), is given by the following formula.

$$S(f, p, d) = \sum_{i=0}^{d} \binom{d}{i} p^i (1-p)^{d-i} \min\left(\frac{(d-i)f}{d}, 1\right)$$

Given the expected guarantee desired by the home users, S (f, p, d), the above expression can be used to derive the overprovision factor, f, based on path failure probability and the number of independent paths.

When f=1, the total capacity provided by d paths to a house is equal to the demand of that house and there is no over-provisioning. In this case, the average fraction of traffic that reaches the ITAPs is equal to 1-p (e.g., the same failure rate as in the case of a single path). It should be noted, however, that having several independent paths (d>1) reduces the variance of the amount of traffic that can reach an ITAP (i.e., if d is sufficiently large, every house can send S (f, p, d) amount of traffic almost all of the time). In order to leverage the benefit of multiple independent paths to improve the average success rate, over-provisioning of the delivery paths is necessary. Also, a fast increase in the success rate with increasing f when f is small results. This rate of increase flattens out when f is large. Based on the above behavior, fault tolerant linear program formulations for the ideal and general link models can be provided.

Below is a linear program formulation of the fault tolerant problem for the ideal case (i.e., when throughput is independent of the path length). For each edge e and each house h, the variable $x_{e,h}$ indicates the amount of flow from h to ITAPs that is routed through e. Also, for each ITAP i, the variable $y_i$ denotes the number of ITAPs opened in equivalence class i. The below integer linear program is similar to the one in Section III. The differences are as follows: (i) the constraint ≤$w_h$ added to the first inequality, (ii) a change in the second constraint from $w_h$ to $w_h d$ in the amount of flow originating from each house, and (iii) a multiplicative factor of f/d on the left-hand side of the capacity constraints (since the amount of capacity each path allocates to each house is f/d). The first modification ensures that the flow from each house is served by independent paths; (ii) and (iii) are for the over-provisioning purpose.

$$\begin{aligned}
&\text{minimize} \sum_{i \in x} y_i \\
&\text{subject to} \sum_{e=(v,h')} x_{e,h} = \sum_{e=(h',v)} x_{e,h} \leq w_h \quad \forall h, h' \in H, h' \neq h \\
&\sum_{e=(h,v)} x_{e,h} - \sum_{e=(v,h)} x_{e,h} \geq w_h d \quad \forall h \in H \\
&f/d \sum_h x_{e,h} \leq \text{Cap}_e \quad \forall e \in E(G) \\
&f/d \sum_{h',e=(v,h)} x_{e,h'} \leq \text{Cap}_h \quad \forall h \in H
\end{aligned}$$

-continued $$f/d \sum_{h',e=(v,i)} x_{e,h'} \leq Cap_i y_i \quad \forall i \in I$$

$$\sum_{e=(v,i)} x_{e,h} \leq w_h y_i \quad \forall i \in I, h \in H$$

$$x_{e,h} \geq 0 \quad \forall e \in E(G), h \in H$$

$$y_i \in \{0, 1, 2, ...\} \quad \forall i \in I.$$

Turning to the problem where the throughput of a connection is a function of the number of hops it traverses, the integer linear program below is similar to the one introduced in Section IV, with a few modifications similar to the ones described in the previous section. The problem without fault tolerance constraints is just a special case of the one with these constraints when d=1 and f=1. As was stated above, it will be appreciated by one of ordinary skill in the art that the problem without fault tolerance constraints is NP-hard. Thus it is also NP-hard to find a minimum number of ITAPs required to cover a neighborhood while providing fault tolerance.

$$\text{minimize} \sum_{i \in x} y_i \text{ subject to}$$

$$\sum_{e=(v,h')} x_{e,h,l,j} = \sum_{e=(h',v)} x_{e,h,l,j+1} \quad \forall h, h' \in H, h' \neq h, l, j \in \{1, ..., L\}, j < 1$$

$$\sum_{e=(h,v),l} x_{e,h,l,j} \geq w_h \quad \forall h \in H$$

$$\sum_{h,l,j \leq l} g(l) x_{e,h,l,j} \leq Cap_e \quad \forall e \in E(G)$$

$$\sum_{h',e=(v,h),l,j \leq l} g(l) x_{e,h',l,j} \leq Cap_h \quad \forall h \in H$$

$$\sum_{h',e=(v,i),l,j \leq l} g(l) x_{e,h',l,j} \leq Cap_i y_i \quad \forall i \in I$$

$$\sum_{e=(u,i),l,j \leq l} x_{e,h,l,j} \leq w_h y_i \quad \forall i \in I, h \in H$$

$$x_{e,h,l,j} \geq 0 \quad \forall e \in E(G), h \in H, l, j \in \{1, ..., L\}, j \leq 1$$

$$y_i \in \{0, 1, 2, ...\} \quad \forall i \in I$$

The greedy and augmenting placement methods for this problem are now presented. The high-level ideas behind these methods are the same as above; ITAPs are opened iteratively, one in each iteration, until all the user demands are satisfied. The difference between the algorithms is in the criterion used to pick an ITAP in each iteration. For the greedy method, it is the ITAP that leads to the maximum increase in the supported demands. In the augmenting method, it is the first ITAP that leads to an increase in the supported demands.

The above methods differ from those presented in previous sections in how they compute the total demands supported by a given set of ITAPs. For the ideal case, the satisfied demands are computed by slightly modifying the above linear program for the ideal link model and solving the resulting linear program. The objective function is changed to be maximizing $\Sigma_h (\Sigma_{e=(h,v)} x_{e,h} - \Sigma_{e=(v,h)} x_{e,h})$, which corresponds to maximizing the supported demands. The variables $y_i$ are replaced by the number of occurrences of i in I'. Furthermore, the second constraint is changed to $\tau_{e=(h,v)} x_{e,h} - \Sigma_{e=(v,h)} x_{e,h} \leq w_h d$ in order to limit the maximum flow from a node. For the general link model, the satisfied demands are computed by applying similar modifications to the above linear program for the general link model.

VI. Handle Workload Variation

So far only placing ITAPs based on static user demands has been considered. As will be appreciated by those of ordinary skill in the art, in practice, user demands change over time and often exhibit diurnal patterns. Since it is not easy to change ITAP locations once they are deployed, it is advantageous to place ITAPs such that they can handle demands over all periods. In this section, two approaches to handle variable workloads are described. While this description focuses on the non fault-tolerant version of the placement problems, the ideas carry over easily to the fault-tolerant version as well.

One approach to take into account workload change is to provision ITAPs based on the peak workload. That is, if w[h][t] denotes the demand of house h at time t, $\max_t w[h][t]$ is used as the demand for house h, and is fed as an input to the placement algorithms described in the previous sections. This approach can be called peak load based placement. This method is simple, but may sometimes be wasteful (e.g., when different houses' demands peak at different times).

To improve efficiency without sacrificing user performance, optimizing ITAP locations for demands over multiple time intervals is explored below.

More formally, the problem can be stated as follows. Each house h has demand w[h][t] at time t. The goal is to place a set of ITAPs such that at any time t, they can serve all the demands generated at t (i.e., w[h][t] for all h's).

Below a greedy heuristic with a logarithmic worst-case bound for the ideal link model is described. The same idea can apply to other link models. The high-level idea is to iteratively place the ITAP such that together with the already opened ITAPs it maximizes the total demands served. Unlike in the previous section, here the total demands include demands over multiple time intervals. More specifically, an ITAP is placed such that it maximizes $\Sigma_{t \in T} SD_t$, where $SD_t$ is the total satisfied demands at time t. This can be computed by changing the greedy method of Section III as follows. In every iteration, for every $j \in I$ and $t \in T$, the graph G' is constructed as in the method of Section III based on the demands at time period t. Then the maximum flow $f_{j,t}$ in this graph is computed. After these computations, the ITAP j that maximizes $\Sigma_t f_{j,t}$ is picked and opened. This method can be called multiple-demand-based greedy placement (M-greedy, for short).

For the peak load based placement method, the approximation factor can be upper bounded as follows. The cost of the optimal solution based on the peak load is at most the sum of the costs of the optimal solutions in each time period (because by simply taking the union of the solutions for each time period, a solution for the peak loads is obtained). Therefore, the approximation factor of the greedy placement using the peak load is at most a factor of $\Sigma_t (\ln D_t)$. When $D_t = D_m$ for all t's, its cost is at most $L \ln(D_m)$. This is roughly L times the approximation factor of the M-greedy method above.

In view of the many possible embodiments to which the principles of this invention may be applied, it should be recognized that the embodiments described herein with respect to the drawing figures are meant to be illustrative only and should not be taken as limiting the scope of invention. For example, for performance reasons the model and method of the present invention may be implemented in hardware, rather than in software. Therefore, the invention as described herein contemplates all such embodiments as may come within the scope of the following claims and equivalents thereof.

For further information see L. Qiu, R. Chandra, K. Jain, and M. Mahdian, "On the Placement of Internet Taps in Wireless Neighborhood Networks", http://www.research.microsoft.com/~liliq/papers/pub/msr-placement2003.pdf, which is herein incorporated in its entirety for everything it describes.

What is claimed is:

1. A method for reducing potential placement locations of Internet Transit Access Points (ITAPs) in a network by identifying equivalence classes of nodes in the network which may be serviced by the same ITAP, the method comprising:
   (a) accepting equivalence class information for the network, wherein the network is a multi-hop wireless mesh network; and
   (b) employing a processor executing computer-executable instructions to perform acts of:
      (i) determining whether a first equivalence class is covered by a second equivalence class; and
      (ii) eliminating the first equivalence class from consideration as a potential placement location for the ITAP if the first equivalence class is covered by the second equivalence class.

2. The method of claim 1 further comprising:
   repeating the determining and eliminating until all equivalence classes covered by the second equivalence class have been identified.

3. A computer-readable storage medium, which does not consist of a modulated data signal, and which comprises computer-executable instructions that, when executed, perform a method for reducing potential placement locations of access points in a network by identifying equivalence classes of nodes in the network which may be serviced by the same access point, the method comprising:
   accepting equivalence class information for the network, wherein the network is a multi-hop wireless mesh network;
   determining whether a first equivalence class is covered by a second equivalence class; and
   eliminating the first equivalence class from consideration as a potential placement location for the access point if the first equivalence class is covered by the second equivalence class.

* * * * *